(12) United States Patent
Domel et al.

(10) Patent No.: US 9,896,192 B2
(45) Date of Patent: Feb. 20, 2018

(54) MINIMALLY INTRUSIVE WINGTIP VORTEX WAKE MITIGATION USING MICROVANE ARRAYS

(75) Inventors: Neal D. Domel, Aledo, TX (US); Eric F. Charlton, Grapevine, TX (US); Daniel N. Miller, Bainbridge Island, WA (US)

(73) Assignee: Lockheed Martin Corroration, Bethesda, MD (US)

(*) Notice: Subject to any disclaimer, the term of this patent is extended or adjusted under 35 U.S.C. 154(b) by 1148 days.

(21) Appl. No.: 13/324,537

(22) Filed: Dec. 13, 2011

(65) Prior Publication Data

US 2013/0146715 A1 Jun. 13, 2013

(51) Int. Cl.
*B64C 23/06* (2006.01)
*B64C 21/10* (2006.01)

(52) U.S. Cl.
CPC ............ *B64C 21/10* (2013.01); *B64C 23/069* (2017.05); *Y02T 50/164* (2013.01); *Y02T 50/166* (2013.01)

(58) Field of Classification Search
CPC .............................. B64C 23/065; B64C 23/06
USPC ...... 244/199.2, 199.4, 200, 200.1, 199.1, 91
See application file for complete search history.

(56) References Cited

U.S. PATENT DOCUMENTS

| | | | | |
|---|---|---|---|---|
| 1,454,479 | A * | 5/1923 | McCullough | 244/200 |
| 1,480,408 | A * | 1/1924 | Miller | 244/200 |
| 1,994,045 | A * | 3/1935 | Nelson | 244/200 |
| 2,768,801 | A * | 10/1956 | Rauth et al. | 244/90 A |
| 3,578,264 | A * | 5/1971 | Kuethe | 244/200.1 |
| 3,712,564 | A | 1/1973 | Rethorst | |
| 3,845,918 | A * | 11/1974 | White, Jr. | 244/199.4 |
| 4,019,696 | A | 4/1977 | Hirt et al. | |
| 4,272,043 | A | 6/1981 | Spillman | |
| 4,354,648 | A | 10/1982 | Schenk et al. | |
| 4,706,910 | A * | 11/1987 | Walsh et al. | 244/130 |
| 5,058,837 | A * | 10/1991 | Wheeler | 244/200.1 |
| 5,806,807 | A * | 9/1998 | Haney | 244/199.3 |
| 6,042,059 | A | 3/2000 | Bilanin et al. | |
| 6,345,790 | B1 * | 2/2002 | Brix | 244/199.4 |
| 7,275,722 | B2 * | 10/2007 | Irving et al. | 244/201 |
| 7,661,629 | B2 | 2/2010 | Shmilovich et al. | |
| 8,191,833 | B1 * | 6/2012 | DiCocco et al. | 244/200.1 |
| 8,226,047 | B2 * | 7/2012 | Gupta et al. | 244/199.3 |
| 2005/0061921 | A1 * | 3/2005 | Egolf | 244/199 |
| 2005/0103944 | A1 * | 5/2005 | Greenblatt | 244/199 |

(Continued)

FOREIGN PATENT DOCUMENTS

| | | |
|---|---|---|
| CN | 102 167 152 | 8/2011 |
| DE | 201 07 863 | 10/2001 |
| EP | 0481661 | 4/1992 |

(Continued)

OTHER PUBLICATIONS

European Patent Office, Extended European Search Report, Jul. 12, 2013, Application No. 12196557.8-1754/2604516, 7 pages.

(Continued)

*Primary Examiner* — Philip J Bonzell
(74) *Attorney, Agent, or Firm* — Reising Ethington P.C.

(57) ABSTRACT

An airfoil tip vortex mitigation arrangement comprising one or more flow directors configured and positioned to re-direct freestream air over a low pressure surface of an airfoil in such a way as to displace and weaken a main tip vortex generated at a tip of the airfoil.

19 Claims, 1 Drawing Sheet

(56) References Cited

U.S. PATENT DOCUMENTS

2009/0016891 A1    1/2009   Parsania et al.

FOREIGN PATENT DOCUMENTS

GB    2468903       9/2010
WO    01/16482      3/2001

OTHER PUBLICATIONS

EP Office Action for EP App. No. 12 196 557.8 dated Feb. 4, 2016. 5 pages.

* cited by examiner

MINIMALLY INTRUSIVE WINGTIP VORTEX WAKE MITIGATION USING MICROVANE ARRAYS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

Mitigation of wake turbulence through the weakening of wake vortices generated at outboard edges of aircraft wings, or outboard and/or inboard edges of ailerons, flaps, or other airfoils.

Description of Related Art Including Information Disclosed Under 37 CFR 1.97 and 1.98

The persistence of a vortex trailing behind a lifting airfoil such as a wing, is dependent not only upon vortex strength, but also upon how well a core of the vortex is defined. Vortex strength is governed by lift, which depends upon area and pressure differences between upper and lower airfoil surfaces. The core is well-defined if the airfoil is thin and if there is a high pressure difference between the upper and lower surfaces near a tip of the airfoil. This allows a streamline to roll around the outboard edge or tip of a wing or the inboard and/or outboard edges or tips of a flap, aileron, or other airfoil, from the high pressure region to the low pressure region along a very short distance. This results in a highly curved, fast moving streamline in a well-defined vortex core, which can persist for a long time downstream of the airfoil. The formation of a well-defined vortex core may be impeded by lengthening the distance traveled by the streamlines rolling from the high pressure region feature such as extra thickness, a non-lifting wing-tip extension, or a device such as a winglet. Such devices are designed to have lift characteristics that compensate for their own weight. They also tend to add drag, although they are designed to add as little as possible. The purpose of such features is to prevent the lifting vortex from forming a well-defined core, thereby allowing the vortex to dissipate quickly.

SUMMARY

An airfoil tip vortex mitigation arrangement comprising one or more flow directors configured and positioned to re-direct freestream air over a low pressure surface of an airfoil in such a way as to displace and weaken a main tip vortex generated at a tip of the airfoil.

DRAWING DESCRIPTIONS

These and other features and advantages will become apparent to those skilled in the art in connection with the following detailed description and drawings of one or more embodiments of the invention, in which.

DETAILED DESCRIPTION

Figure 1:
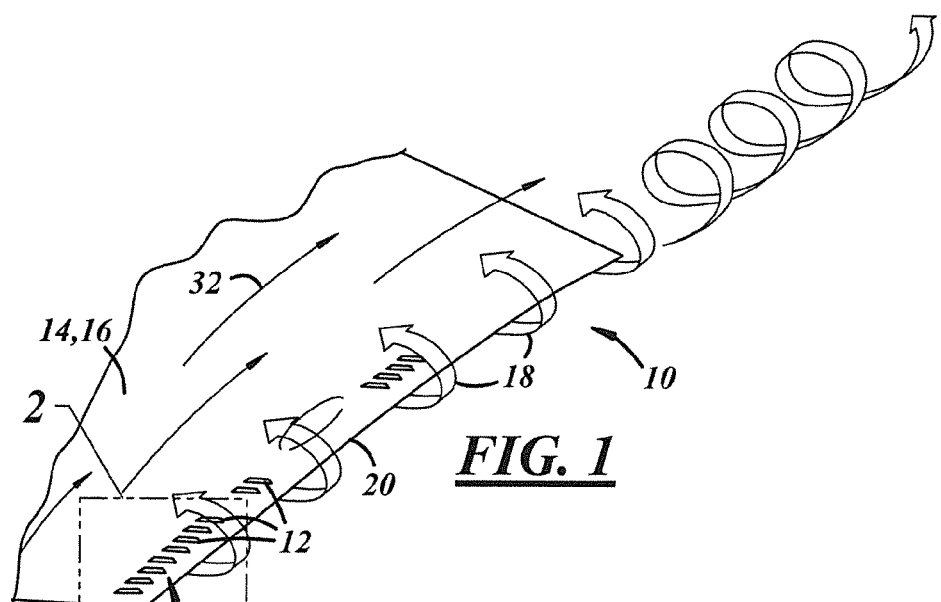
FIG. 1 is a partial top perspective view of an airfoil tip vortex mitigation arrangement installed adjacent a tip of an airfoil with arrows showing freestream airflow over the low pressure upper surface of the airfoil and higher pressure airflow rolling up from under the airfoil to form a tip vortex.
Figure 2:
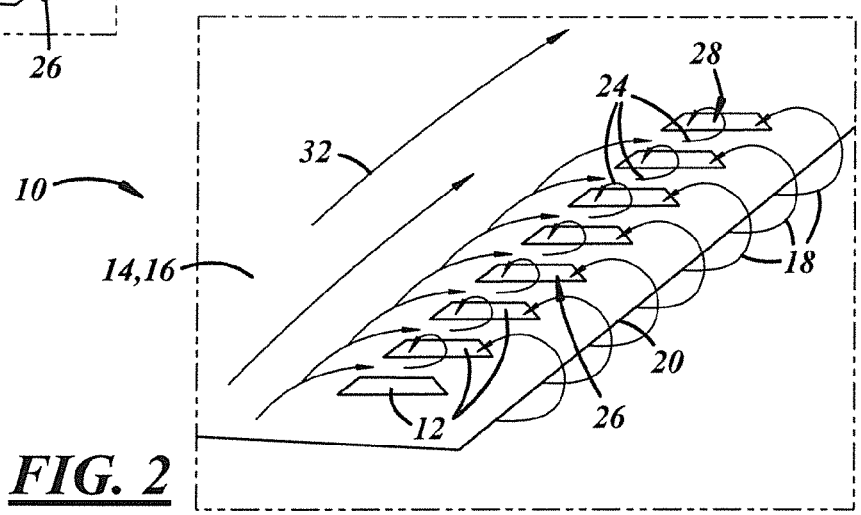
FIG. 2 is a magnified view of region 2 of FIG. 1 with arrows showing freestream airflow redirected to form a co-rotating array of vortices, which diffuses the effective core of the main airfoil vortex.
Figure 3:
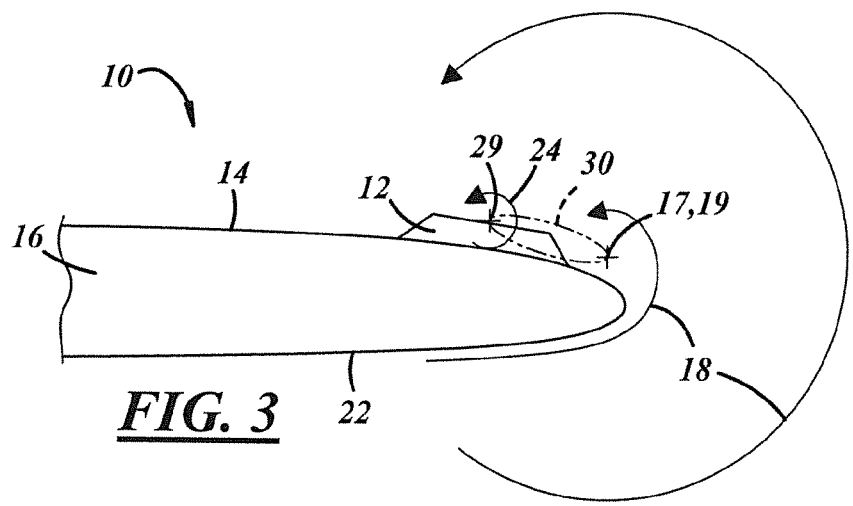
FIG. 3 is a front view of the portion of the airfoil and the tip vortex mitigation arrangement shown in region 2 of FIG. 1.

An arrangement for weakening a wake vortex being generated at an outboard edge or tip of a wing, or at an inboard and/or outboard edge or tip of an aileron, flap, or other airfoil, is generally shown at 10 in FIGS. 1-3. The arrangement 10 may include one or more flow directors 12 configured and positioned to re-direct freestream air flowing over a low pressure surface 14 of an airfoil 16 such as a wing, strake, flap, canard, flaperon, or elevon.

In this document the term "longitudinal" is used to refer to a direction parallel to the motion of freestream air relative to a subject aircraft. The term "inboard" is used to refer to a direction generally toward a longitudinal fuselage centerline of an aircraft from a point spaced laterally from that fuselage centerline, and the term "outboard" is used to refer to a direction away from the longitudinal centerline of the aircraft. The term "inward", in reference to an airfoil of a subject aircraft, is used to refer to a direction toward a longitudinal centerline of the airfoil from a point spaced laterally from that airfoil centerline and the word "outward" is used to refer to a direction away from that longitudinal airfoil centerline.

The flow directors 12 may be arranged to direct freestream air over a low pressure surface 14 in such a way as to displace and weaken a main tip vortex 18 of the airfoil 16, i.e., a vortex formed at an inboard or outboard tip 20 of the airfoil 16 by relatively high pressure air flowing generally spanwise from under the airfoil 16 and rolling helically upward, inward, and aft around an inboard or outboard edge or tip 20 of the airfoil 16. The outboard edge or tip of an airfoil 16 may comprise a swept leading edge of the airfoil 16 where the airfoil is, for example, a strake or delta wing variant, and where main vortices 18 may therefore run the length of the leading edge of the airfoil 16. The flow directors 12 may preferably be designed to be minimally intrusive in an aerodynamic sense.

Freestream air, re-directed by the flow directors 12, displaces and weakens the main tip vortex 18, hastening dissipation of the main tip vortex 18 so that, among other things, trailing aircraft are less likely to encounter wake turbulence sufficient to compromise operators' ability to control such trailing aircraft. The flow directors 12 may also be arranged to displace and weaken a core 17 of the main tip vortex 18 to hasten the dissipation of the main tip vortex 18 without significantly diminishing local lift effects of the main tip vortex 18.

As best shown in FIGS. 2 and 3, the flow directors 12 may comprise one or more arrays of small-scale (height relative to airfoil chord between approximately ¼% and 1%) vortex generators positioned adjacent and along the inboard and/or outboard edge or tip 20 of the airfoil 16 on a low pressure, e.g., upper, surface 14 of the airfoil 16 and oriented to direct freestream air outboard such that one or more co-rotating vane vortices 24 are formed on the low pressure surface of the airfoil 16. The vane vortices 24 may be formed in respective positions where they will impede the circulation of the relatively high pressure air that's rolling upward around the inboard or outboard tip 20 and helically inboard and aft from a high pressure region 22—e.g., an under-surface—of the airfoil 16 to form the radially inner core 17 of the main tip vortex 18. The vortex generators 12 may be positioned and oriented to cause the vane vortices 24 to co-rotate, i.e., to turn in the same helical sense or direction as the main tip vortex 18. This may have the effect of reinforcing the main tip vortex 18 adjacent its origin at the airfoil tip 20 so that local lift effects of the main tip vortex 18 are enhanced while diffusing the main vortex core.

The flow directors 12 may comprise a plurality of microvanes extending from the low pressure upper surface 14 of the airfoil 16 in respective orientations generally normal to the surface 14 from which they extend. The plurality of microvanes may be disposed in a serial microvane array, as is generally indicated at 26 in FIGS. 1 and 2, along the outboard tip 20 of the airfoil 16 in a row generally parallel to an airfoil tip 20, and where the airfoil 16 is a wing, along its outboard edge or wingtip. The microvanes 12 of the microvane array 26 may be oriented to form a serial array of vane vortices, as are generally indicated at 28 in FIG. 2, on the low pressure surface 14 of the airfoil 16 adjacent and along an airfoil tip 20. The serial array of vane vortices or vortex array 28 may be formed between the microvane array 26 and an airfoil tip 20 so that the serial array of vane vortices 28 blocks or otherwise inhibits the flow of high pressure air rolling helically upward, inward, and aft around the airfoil tip 20, disrupting the core 17 of the main tip vortex 18. In other words, the vortex array 28 causes the airfoil tip 20 to act as if it were thicker, thereby impeding the formation of a well-defined vortex core.

The microvanes of the microvane array 26 may also be oriented and positioned to form the vortex array 28 such that respective centers of rotation 29 of the vortices of the vortex array 28 are spaced inboard from a center of rotation 19 of the airfoil tip vortex 18 as is best shown in FIG. 3. This arrangement of the vane vortex array 28 provides an opposition region, best shown at 30 in FIG. 3, in which induced velocities of the vane vortex array 18 and the airfoil tip vortex 18 oppose each other. This causes a combined effective vortex core to be distributed between the vane vortex array 28 and the airfoil tip vortex core 17, which provides a rapid far field vortex dissipation effect. However, because the vortices of the vane vortex array 28 are rotating in the same sense as the airfoil tip vortex 18, the induced velocities of the vane vortex array 28 and the airfoil tip vortex 18 reinforce each other, precluding or reducing lift degradation or induced drag penalty.

Each microvane of the microvane array 26 may be oriented at an angle of approximately (within plus or minus 15 degrees of) 45 degrees as measured relative to the direction of freestream airflow 32 about an axis generally normal to a portion of the low pressure surface 14. Microvanes of the microvane array 26 may be supported such that trailing edges of the microvanes 12 are angled outward relative their respective leading edges as shown in FIGS. 1 and 2. However, the microvanes 12 could be oriented at any appropriate angle that will allow them to be effective in dissipating wake turbulence within a desired range of airspeeds. Microvane angle may be optimized for final approach speeds and other speeds at which high angles of attack and lift enhancing aircraft configurations such as flap extension tend to create or greatly enhance the strength of tip vortices 18.

Each microvane 12 of the microvane array 26 may have a height approximately 0.4% of a tip chord length of the airfoil, e.g., approximately ¼ inch on a 5 foot chord (between approximately ⅛ inch and ½ inch, or ¼% and 1% of the chord), so as to minimize drag while providing sufficient free stream flow diversion to disrupt the core 17 of the main tip vortex 18 enough to provide a desired reduction in main tip vortex longevity. Each vane 12 has a length to height ratio of approximately 8 (2 inches long if height is ¼ inch), or any other suitable length. Preferably, however, the ratio of length to height may be between approximately 2 and 10 to, again, provide a desired tradeoff between parasite drag and early wake vortex dissipation.

The microvane array 26 may extend aft along the airfoil tip 20 to a point where beneficial effects no longer outweigh the associated additional drag penalty. Generally, that point is where the main tip vortex 18 detaches from the airfoil.

An arrangement such as is disclosed above may improve an aircraft's performance, especially under conditions such as low airspeeds or high angles of attack, by increasing the lift generated by airfoils and reducing the danger to following aircraft by causing early dissipation of airfoil tip vortices.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An airfoil tip vortex mitigation arrangement comprising one or more flow directors configured and positioned to re-direct freestream air over a low pressure surface of an airfoil, the one or more flow directors being arranged to direct freestream air toward a tip of the airfoil in such a way as to displace and weaken a main tip vortex generated at the tip of the airfoil.

2. An airfoil tip vortex mitigation arrangement as defined in claim 1 in which the one or more flow directors are arranged to direct freestream air in such a way as to displace and weaken a core of the main tip vortex generated at a tip of the airfoil.

3. An airfoil tip vortex mitigation arrangement as defined in claim 2 in which the one or more flow directors comprise one or more vortex generators positioned adjacent a tip of the airfoil on a low pressure surface of the airfoil and oriented to direct freestream air such that one or more vane vortices are formed on the low pressure surface of the airfoil in respective positions inhibiting relatively high pressure air that is rolling around the tip and aft from a high pressure region of the wing to form a core of the main tip vortex.

4. An airfoil tip vortex mitigation arrangement as defined in claim 3 in which the one or more vortex generators are positioned and oriented to cause the vane vortices to turn in the same helical sense as the main airfoil tip vortex.

5. An airfoil tip vortex mitigation arrangement as defined in claim 4 in which the one or more vortex generators comprise a plurality of vanes extending from the low pressure surface of the airfoil.

6. An airfoil tip vortex mitigation arrangement as defined in claim 5 in which the plurality of vanes is disposed in a vane array along a tip of the airfoil and the vanes of the vane array are oriented to form an array of vane vortices on the low pressure surface of the airfoil adjacent and along the tip of the airfoil.

7. An airfoil tip vortex mitigation arrangement as defined in claim 6 in which one or more vanes of the vane array are oriented and positioned to form respective vane vortices in respective positions where respective centers of rotation of the vane vortices are spaced inboard from a center of rotation of the airfoil tip vortex.

8. An airfoil tip vortex mitigation arrangement as defined in claim 7 in which each vane of the vane array is oriented at an angle of approximately 45 degrees measured relative to the direction of freestream airflow about an axis generally normal to a portion of the low pressure surface supporting the vane such that trailing edges of the vanes are angled outward relative their respective leading edges.

9. An airfoil tip vortex mitigation arrangement as defined in claim 7 in which at least one vane of the vane array has a height approximately 0.4% of the airfoil tip chord length.

10. An airfoil tip vortex mitigation arrangement as defined in claim 7 in which at least one vane of the vane array has a ratio of length to height of approximately 8.

11. An airfoil tip vortex mitigation arrangement as defined in claim 7 in which the vane array extends aft along the airfoil tip to a point where beneficial effects no longer outweigh the associated additional drag penalty.

12. An airfoil tip vortex mitigation arrangement as defined in claim 11 in which the vane array extends aft along the airfoil tip to a point adjacent a position along the airfoil tip where the main vortex detaches from the airfoil.

13. An airfoil tip vortex mitigation arrangement comprising one or more vortex generator vanes carried on a low pressure surface of the airfoil along and adjacent a tip of the airfoil and oriented and positioned to direct freestream air outboard such that the freestream air impedes circulation of the airfoil tip vortex over the airfoil and displaces a core of the airfoil tip vortex outboard, the freestream air being directed to form vane vortices rotating in the same sense as the airfoil tip vortex and having respective centers of rotation disposed within the airfoil tip vortex and spaced inward from a center of rotation of the airfoil tip vortex.

14. An airfoil tip vortex mitigation arrangement as defined in claim 13 in which each vane of the vane array is oriented at an angle of approximately 45 degrees measured relative to the direction of freestream airflow about an axis generally normal to a portion of the low pressure surface supporting the vane such that trailing edges of the vanes are angled outward relative their respective leading edges.

15. An airfoil tip vortex mitigation arrangement as defined in claim 13 in which the vane array extends aft along the airfoil tip to a point where beneficial effects no longer outweigh the associated additional drag penalty.

16. An airfoil tip vortex mitigation arrangement as defined in claim 13 in which the vane array extends aft along the airfoil tip to a point adjacent a position along the airfoil tip where the main vortex detaches from the airfoil.

17. An airfoil tip vortex mitigation arrangement as defined in claim 13 in which at least one vane of the vane array has a height approximately 0.4% of the airfoil tip chord length.

18. An airfoil tip vortex mitigation arrangement as defined in claim 13 in which at least one vane of the vane array has a ratio of length to height of approximately 8.

19. A method of mitigating an airfoil tip vortex, the method including the step of displacing and weakening a main tip vortex generated at a tip of an airfoil by redirecting freestream air over a low pressure surface of the airfoil in such a way as to form vane vortices rotating in the same sense as the airfoil tip vortex and having respective centers of rotation disposed within the airfoil tip vortex and spaced inward from a center of rotation of the airfoil tip vortex.

* * * * *